United States Patent [19]

Yutaka

[11] Patent Number: 4,831,701
[45] Date of Patent: May 23, 1989

[54] METHOD OF MAKING A CORROSION RESISTANT ALUMINUM HEAT EXCHANGER USING A PARTICULATE FLUX

[75] Inventor: Ishii Yutaka, Isesaki, Japan

[73] Assignee: Sanden Corporation, Gumma, Japan

[21] Appl. No.: 828,674

[22] Filed: Feb. 12, 1986

[30] Foreign Application Priority Data

Feb. 12, 1985 [JP] Japan .................................. 60-23451

[51] Int. Cl.⁴ ............................................. B21D 33/02
[52] U.S. Cl. ................................. 29/157.3 R; 228/183
[58] Field of Search .................. 29/157.3 R; 228/224, 228/183, 263.17, 223, 56.3, 41; 148/26

[56] References Cited

U.S. PATENT DOCUMENTS

| Re. 32,309 | 12/1986 | Hwang .................................. 148/23 |
| 2,565,477 | 8/1951 | Crowell et al. ..................... 228/56.3 |
| 2,837,450 | 6/1958 | Moore et al. . |
| 3,440,712 | 4/1969 | Stroup et al. . |
| 3,703,254 | 11/1972 | Maierson et al. .................. 228/56.3 |
| 3,951,328 | 4/1976 | Wallace et al. . |
| 3,971,501 | 7/1976 | Cooke . |
| 4,358,485 | 11/1982 | Kern et al. . |
| 4,579,605 | 4/1986 | Kawase et al. ...................... 148/26 |
| 4,619,715 | 10/1986 | Hwang ................................ 148/23 |

FOREIGN PATENT DOCUMENTS

| 53-033836 | 9/1978 | Japan . |
| 0033836 | 3/1979 | Japan .................................. 228/224 |
| 0160869 | 12/1981 | Japan ............................. 228/263.17 |
| 57-22868 | 2/1982 | Japan . |
| 0103958 | 6/1983 | Japan ............................. 228/263.17 |
| 0229280 | 12/1984 | Japan ............................. 228/263.17 |
| 59-218263 | 12/1984 | Japan . |
| 334031 | of 1972 | U.S.S.R. ............................... 148/23 |
| 471980 | of 1975 | U.S.S.R. ............................... 148/23 |

OTHER PUBLICATIONS

*Metal Handbook*, 8th Ed., vol. 6, Welding and Brazing: Brazing of Aluminum Alloys, American Society for Metals, 1971, pp. 675–684.

Primary Examiner—Howard N. Goldberg
Assistant Examiner—Irene Cuda
Attorney, Agent, or Firm—Banner, Birch, McKie & Beckett

[57] ABSTRACT

A method of treating a heat exchanger made of aluminum or an aluminum alloy comprising applying onto the surface of the aluminum heat exchanger a noncorrosive flux having a flux core with an outer coating of zinc or a zinc alloy formed by vacuum vapor deposition or ion plating, and then heating the resulting heat exchanger to effect brazing. A diffused zinc layer forms on the surface of the heat exchanger and protects it from corrosion, in particular, from electrolytic corrosion.

8 Claims, 1 Drawing Sheet

METHOD OF MAKING A CORROSION RESISTANT ALUMINUM HEAT EXCHANGER USING A PARTICULATE FLUX

BACKGROUND OF THE INVENTION

1. Field of the Invention

The present invention relates to a corrosion resistant aluminum heat exchanger, and more particularly, relates to a method for treating aluminum heat exchangers, especially automotive heat exchangers, to make them corrosion resistant.

2. Description of Related Art

Because of their excellent corrosion resistance, copper alloys have long been used for fabricating automotive heat exchangers, such as radiators, condensers and evaporators. In recent years, however, aluminum and aluminum alloys have begun to replace the copper alloys in automotive applications due to their generally lower cost and the potential for significant savings in weight.

Unfortunately, heat exchangers made of aluminum and aluminum alloys are more susceptible to corrosion. The aluminum heat exchangers are particularly susceptible to electrolytic corrosion caused by water-soluble salts which are widespread in the environment. For example, a heat exchanger used as the condenser of an automotive air conditioning apparatus will be exposed to extended operation at elevated temperatures while at the same time being exposed to the influence of water-soluble salts. These circumstances cause pits to form on the heat exchanger surface. Within a short period of time these pits quickly grow and eventually cause holes or cracks to form in the heat exchanger core leading to the leakage of refrigerant. Of course, in most cases the heat exchanger must then be replaced.

In order to prevent refrigerant leakage caused by such pit formation, the surface of automotive heat exchangers generally are chemically treated or are provided with a physical coating in order to form a protective film. Provided a faultless protective film can be formed and maintained on the surface of the heat exchanger, this treatment provides good protection against corrosion. However, it is virtually impossible to form a faultless protective film on the heat exchanger surface, thus satisfactory corrosion resistance is not attained by this method. Moreover, such films are easily damaged by physical impacts (e.g., from collisions, mishandling, etc.), causing cracks to form in the protective film thus destroying its integrity.

In another method designed to solve the corrosion problem, illustrated in FIG. 1, metals such as zinc (Zn) and/or tin (Sn) are incorporated into the fin material 2, in order to lower its electrical potential relative to that of flat tube 1. In this way, the fin material 2 is preferentially corroded, thus protecting the flat tube from corrosion. This approach, however, requires the use of special fin materials, thus increasing the expense of the heat exchanger.

It also is known to protect the heat exchanger by coating the heat exchanger core with a flux containing zinc chloride ($ZnCl_2$), followed by brazing to diffuse the zinc over the surface of the heat exchanger. However, the flux itself is quite corrosive and if excess flux is left on the core it corrodes the tube wall leading to tube failure. Thus, in order to ensure that any excess flux is removed, the heat exchanger must be thoroughly washed after brazing. This procedure introduces another step in the manufacturing process and also requires expensive pollution abatement facilities to handle the wash water.

On the other hand, in cases where a noncorrosive flux is used for brazing the heat exchanger, while the washing of excess flux and problem with flux-related corrosion can be avoided, the above-described problems relating for example to electrolytic corrosion are still present and must be addressed.

SUMMARY OF THE INVENTION

It is an object of the present invention to provide a method of treating an aluminum heat exchanger to make it corrosion resistant.

It is another object of the present invention to provide a method of treating an aluminum heat exchanger to make it corrosion resistant which requires no washing after brazing and therefore is free from pollution.

Yet another object of the present invention is to provide a heat exchanger made of aluminum or an aluminum alloy having a diffused zinc layer which retards or prevents pit formation through the heat exchanger wall.

According to the present invention, there is provided a method for treating an aluminum heat exchanger to make it corrosion resistant wherein noncorrosive flux particles are applied onto the surface of the aluminum heat exchanger, said noncorrosive flux particles comprising a flux core preferably consisting essentially of a mixture of potassium fluoraluminate complexes, and an outer coating of a zinc or a zinc alloy film preferably applied by vacuum vapor deposition or ion plating. The heat exchanger then is heated in a furnace to effect brazing and cause a diffused zinc layer to form on the surface of the heat exchanger which diffused layer prevents the formation of pits.

Further objects, features and other aspects of this invention will be understood from the following detailed description of a preferred embodiment of this invention with reference to the annexed drawings.

DETAILED DESCRIPTION

Figure 2:
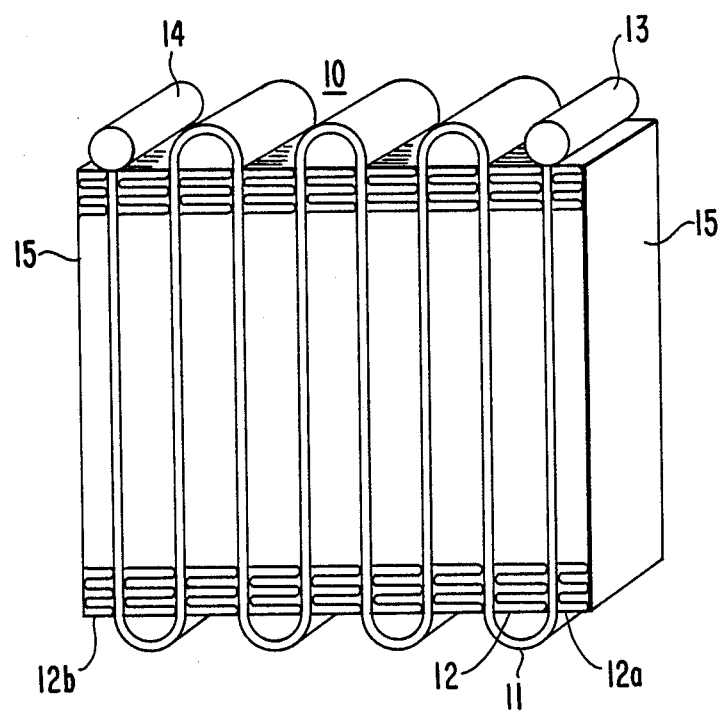
FIG. 2 is a perspective view of a heat exchanger illustrating the anti-corrosion treatment of the present invention.

Referring to FIG. 2, a heat exchanger 10 according to one embodiment of the present invention is illustrated. The heat exchanger 10 has an arrangement generally similar to known serpentine-type heat exchangers. The heat exchanger 10 comprises a flat tube 11, bent so as to form a tortuous flow path. The flat tube has an internal construction of multiple parallel channels (not shown). Thus, the flat tube 11 provides a plurality of parallel fluid passageways. Corrugated fins 12, each of which is fabricated, for example, from aluminum or an aluminum alloy and folded into a wave form, are disposed between opposing parallel portions of flat tube 11.

One end of flat tube 11 is brazed to an inlet pipe or inlet header 13, communicating, for example, with one end of a refrigerant circuit, and the other end of the flat tube is brazed to the outlet pipe or outlet header 14.

Liquid refrigerant or other heat exchange fluid flows from inlet pipe 13 through the parallel flow channels of flat tube 11 and out through outlet pipe 14. Protective plates 15 are securely joined to the outermost upright portions of flat tube 11, by being brazed to the outer corrugated fin 12a and 12b.

Flat tube 11 of heat exchanger 10 generally is fabricated from pure aluminum or from a corrosion resistant aluminum alloy (e.g., an aluminum-manganese alloy, an aluminum manganese-copper alloy, an aluminum-copper alloy, etc.). Typically any of the AA 1000 series aluminum alloys should be suitable. Generally, the heat exchanger tube has a wall thickness of about $700\mu$. Corrugated fins 12 typically comprise an aluminum alloy brazing sheet having an aluminum-manganese alloy core, and a cladding of an aluminum-silicon alloy brazing filler metal. As those skilled in the art will recognize, aluminum alloys having from about 6.8–13% (by weight) silicon are particularly useful as brazing filler metals.

Figure 1:
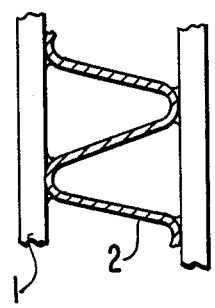
FIG. 1 is a partial sectional view of a heat exchanger showing an anti-corrosion treatment of the prior art.
Figure 3:
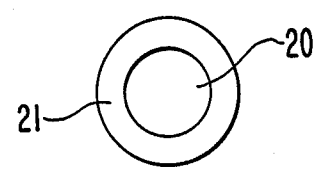
FIG. 3 is a cross-sectional view of a noncorrosive flux particle used in the present invention.

The present invention uses a noncorrosive particulate flux having a flux core 20 preferably consisting essentially of a mixture of potassium fluoroaluminate complexes and having a film coating of zinc or a film coating of a zinc alloy 21 such as an aluminum zinc alloy. The coating is formed on the surface of the flux core preferably by vacuum vapor deposition or ion plating. Typically, the flux core consists of a mixture of potassium tetrafluoroaluminate ($KAlF_4$) and potassium hexafluoroaluminate ($K_3AlF_6$). A typically flux particle is illustrated in FIG. 3.

The flux is needed to remove the oxide layer normally present on exposed aluminum surfaces. The flux also promotes flow of the brazing filler metal and inhibits further oxide formation during brazing. Preferably, the flux core comprises a complex of potassium fluoride (KF) and aluminum fluoride ($AlF_3$) in a weight ratio ($KF:AlF_3$) between about 35:65 and 55:45 (most preferably between about 40:60 and about 50:50). U.S. Pat. No. 3,951,328—Wallace et al. issued on Apr. 20, 1976 adequately discloses all of the relevant characteristics and preparation procedures for a suitable material for flux core 20, and is hereby incorporated by reference. Briefly, methods of preparing a suitable flux include, mixing and fusing potassium tetrafluoroaluminate and potassium fluoride, mixing previously prepared potassium hexafluoroaluminate and potassium tetrafluoroaluminate, or mixing previously prepared potassium hexafluoroaluminate and aluminum fluoride. It also is possible to use pure potassium tetrafluoroaluminate as the flux powder. Suitable fluxes for use as the flux core in this invention can be obtained from Alcan Aluminum Corp. under the trademark NOCOLOK. The flux core material is nonhygroscopic.

The flux core generally has a maximum diameter of about 100 mesh, i.e., a diameter not greater than about 100 mesh, but preferably has a diameter above about $15\mu$. The coating thichness of the metal film depends inter alia on the mass loading used when applying the noncorrosive flux on the heat exchanger and may vary within wide limits. For example, a metal film thickness between about $30\mu$ and $100\mu$ can be used.

The coated flux particles are applied onto the surface of an assembled heat exchanger by spray coating. Due to the nonhygroscopicity of the flux, the particles can be applied as an aqueous slurry. It would also be possible to apply the noncorrosive flux by dipping the heat exchanger into an aqueous flux bath. Of course, organic vehicles also could be used if desired. The flux can be applied at a loading of about 4 grams flux per square meter of heat exchanger surface.

The heat exchanger then is heated in a furnace at a temperature of about 600° C. for about 5 minutes to effect brazing. During the brazing operation, the zinc or zinc alloy metal film on the flux particles melts prior to the flux per se and the molten metal diffuses into the surface of the heat exchanger tube to form a diffused zinc laayer on the surface of the heat exchanger. Then, the flux melts and together with the aluminum-silicon alloy cladding on the fins causes a bond to form between the fins and the tube wall of the heat exchanger.

The diffused zinc layer formed on flat tube 11 functions as a sacrificial anode. As a consequence of how it is formed, the zinc layer has a higher density of zinc on the upper surface of flat tube relative to the diffused inner portion of the zinc layer. As a consequence of this structure, corrosion occurs in a horizontal direction in preference to corrosion in a vertical direction. In other words, the corrosion tends to develop and progress along the surface of the flat tube, rather than or in preference to pit formation through the tube wall. As a result, any corrosion which occurs on the surface of the heat exchanger does not directly result in leakage of refrigerant. Consequently, the heat exchanger's life is extended significantly.

The diffused zinc layer preferably has a maximum thickness of about $200\mu$, and the density of zinc on the surface of the heat exchanger is from about 0.2 to 2.0% (by weight). If the zinc layer has a thickness greater than about $200\mu$, corrosion tends to occur in the vertical direction rather than just on the surface. Moreover, such corrosion develops within a short time period, particularly where an uneven or non-uniform vertical gradient in the zinc density exists.

As noted above, the density of zinc at the surface of the diffused zinc layer is preferably from about 0.2 to 2.0%. When the density is lower than about 0.2%, a satisfactory sacrificial anode effect is not attained, and the ability to form simply a surface corrosion is impaired. When the density is greater than about 2.0%, even though there is a sufficient sacrificial anode effect corrosion tends to develop quite rapidly because of an excessive wearing of zinc.

Example

The effectiveness of the present invention in controlling corrosion in an aluminum heat exchanger was confirmed by a corrosion test. A heat exchanger treated in accordance with the present invention, i.e., having applied thereto a noncorrosive flux comprising a flux core consisting essentially of a mixture of potassium fluoroaluminate complexes with a coating of zinc, was compared to an untreated heat exchanger by subjecting them to a 360 hour CASS test according to Japanese Industrial Standards (JIS) DO201 "General Rules of Electroplating for Automobile Parts". After testing, the two heat exchangers were examined to determine the maximum depth of pits formed in their outer surfaces. Results obtained in this test are reported in Table 1.

TABLE 1

| Heat Exchanger | Results of CASS Test (360 hrs) | |
| --- | --- | --- |
| | Maximum Depth of Corrosion | State of Corrosion |
| Untreated | 0.50 mm | Vertical Pits |
| Treated By | 0.04 mm | Surface (horizontal) |

TABLE 1-continued

| | Results of CASS Test (360 hrs) | |
|---|---|---|
| Heat Exchanger | Maximum Depth of Corrosion | State of Corrosion |
| This Invention | | Corrosion |

As is shown in Table 1, the heat exchanger treated in accordance with the present invention was clearly superior to the untreated heat exchanger with respect to its corrosion resistance.

It is recommended that heat exchangers treated in accordance with the present invention also be subjected to an additional chemical treatment and/or physical coating to form a protective layer on its surface. Such treatment provides a further degree of corrosion resistance and maximizes the useful life of the heat exchanger core.

The anti-corrosion treatment of the present invention provides the following advantages. A diffused zinc layer of excellent corrosion resistance is formed on the surface of the heat exchanger without requiring additional heating operations, since the diffusion of zinc occurs simultaneously with the brazing of the heat exchanger. There is no need to use any special materials for fabricating the fins for the purpose of anticorrosion since the flux per se is treated with zinc. There also is no need to wash the heat exchanger after brazing since a non-corrosive flux is used in the invention. Moreover, the invention has the additional advantage that the weakest areas of the heat exchanger, namely, those areas around fillets, also are protected against corrosion since a diffused zinc layer forms around them from the flow of molten zinc during brazing. Electrolytic corrosion which usually occurs between a flat tube and a solder also can be prevented, as well, by using the flux of the present invention to braze the heat exchange core to the inlet and outlet pipes.

While the present invention has been described in detail in connection with a preferred embodiment, it is understood that this embodiment is merely exemplary and the invention is not restricted thereto. It will be recognized by those skilled in the art that other variations and modifications can be easily made within the scope of this invention which is defined by the appended claims.

What is claimed is:

1. A method of treating an aluminum heat exchanger to make it corrosion resistant comprising
   (a) applying a noncorrosive particulate flux onto the surface of the aluminum heat exchanger, said noncorrosive particulate flux comprising a flux core with an outer coating of zinc or a zinc alloy; and
   (b) heating the heat exchanger to effect brazing and cause the zinc or zinc alloy to diffuse into the surface of the heat exchanger and form a diffused zinc layer.

2. The method of claim 1, wherein said flux core consists essentially of a mixture of potassium fluoroaluminate complexes.

3. The method of claim 1, wherein said diffused zinc layer has maximum thickness of about $200\mu$.

4. The method of claim 1, wherein said diffused zinc layer has a zinc density at the surface of the heat exchanger of from about 0.2 to 2.0% (by weight).

5. The method of claim 2, wherein said flux core comprises a mixture of potassium tetrafluoroaluminate and potassium hexafluoroaluminate.

6. The method of claim 1, wherein said flux core is in the form of particles having a maximum diameter of about 100 mesh.

7. The method of claim 6 wherein said outer coating of zinc or a zinc alloy has a thickness between about $30\mu$ and $100\mu$.

8. The method of claim 1, wherein said heat exchanger is a condenser of an automotive air conditioner.

* * * * *